United States Patent Office 3,440,467
Patented Apr. 22, 1969

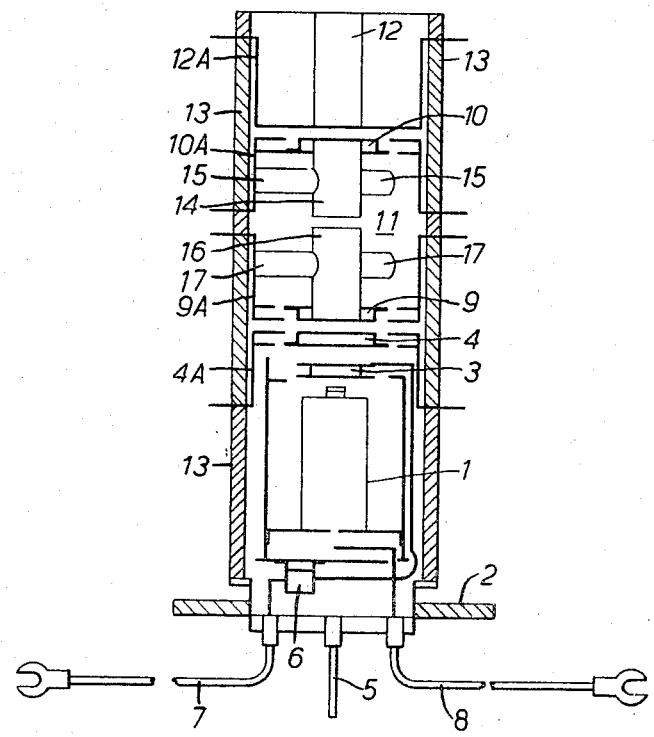

3,440,467
GAS FILLED THYRATRONS HAVING IMPROVED
ELECTRODE COOLING PROVISIONS
Hugh Menown and Eric Jones, Essex, England, assignors
to English Electric Valve Company Limited, London,
England, a British company
Filed Aug. 8, 1966, Ser. No. 570,879
Claims priority, application Great Britain, Sept. 14, 1965,
39,085/65
Int. Cl. H01j 61/52, 5/48, 7/24
U.S. Cl. 313—42                                    9 Claims

ABSTRACT OF THE DISCLOSURE

A gas filled thyratron having a cathode, at least one grid, an anode and a succession of spaced further electrodes providing a plurality of breakdown gaps which are effectively in series. A thermally conductive member is provided which is connected to the further electrode nearest the anode and which provides a conducting path for heat from that electrode to the outside of the tube envelope.

---

This invention relates to gas filled thyratrons and is for improvements in or modifications thereof.

Thyratrons as illustrated in the accompanying drawing and described hereinbelow comprise, within an envelope which is filled with hydrogen, deuterium or some similar gas or mixture of gases, a cathode, one or more grids to which triggering pulses are applied, and an anode. In order to increase the maximum hold-off voltage that can be applied to the anode of such a thyratron, there is provided, between the anode and the first input firing grid which is furthest from the cathode, a succession of spaced further electrodes providing a plurality of breakdown gaps which are effectively in series, again as illustrated in the accompanying drawing and discussed more fully hereinbelow and in the United States patent application Ser. No. 479,807, now abandoned.

During operation the said spaced further electrodes dissipate energy. They are, therefore, heated. In practice, a major source of energy to be dissipated is the inverse voltage which appears in some circuits immediately after the tube becomes conductive on the electrode which is closest to the anode and a serious limiting defect of a tube as described and illustrated in the parent specification is that this electrode becomes excessively heated. Another defect of the said tube is that the ions which are produced in the large drift space near the anode when the tube becomes conductive are slow to clear and the tube is accordingly slow to recover after firing, i.e., to resume a state in which it will not fire again until at least the correct predetermined trigger voltage is again applied. The present invention seeks to overcome these defects.

According to this invention a gas filled thyratron comprising, in an envelope, a cathode, at least one grid and a succession of spaced further electrodes between its anode and its grid furthest from the cathode, providing a plurality of breakdown gaps which are effectively in series, has located in at least one drift space between two of said spaced further electrodes nearest to the anode, at least one good heat conducting member fixed to that one of said two electrodes which is nearer to said anode and at least one good heat conducting path is provided from said member to the outside of the tube envelope to conduct away heat from said electrode when said tube becomes conductive.

Preferably said thyratron has a flanged cylindrical connecting member which connects the electrode nearest the anode to the exterior of the envelope and said path includes said connecting member, a radial heat conducting path being provided to said connecting member from the heat conducting member which is fixed to the electrode nearest the anode.

In a preferred construction the heat conducting member fixed to the electrode nearest the anode is a thick tubular member which is co-axial with the tube and is connected to the connecting member of said electrode by a thick tubular heat conductor or a plurality of such conductors circumferentially spaced.

Preferably there is also provided in the drift space between the two electrodes nearest the anode a second good heat conducting member fixed to that one of said two electrodes which is further from said anode and at least one good heat conducting path is provided between said second member and the outside of the envelope, the two heat conducting members being in mutually insulated relationship.

Preferably the good heat conducting path for the second member includes at least one good heat conductor between said second member and the said flanged cylindrical connecting member of the electrode to which said second member is fixed.

If the tube has more than one large drift space, e.g., in the case of a tube with three (or more) breakdown gaps effectively in series, a number of additional heat conducting members similar to those above set forth and with associated heat conducting paths similar to those above set forth may be and preferably are provided in the further large drift space or spaces.

The only electrode which is normally liable to have to dissipate very large quantities of heat is the electrode nearest to the anode and therefore this electrode is normally the only one which really requires the provision of the heat conducting member and associated heat conducting path in order to conduct away heat. Nevertheless the said member also serves the very useful purpose of collecting ions from the drift space in which it is located and therefore greatly assists quick recovery of the tube after firing. It is primarily for this reason that additional heat conducting members are preferably also provided on other electrodes as well as on the electrode nearest the anode (where, of course, there is room for their convenient provision), i.e., their main purpose, in such cases, to collect ions, though they will, of course, conduct away heat as well.

The invention is illustrated in the accompanying drawing which is a diagrammatic representation action of a preferred tetrode thyratron in accordance with the invention.

Referring to the drawing, 1 is a cathode-heat shield assembly which is rigidly mounted on a base and flange 2 which provides external connection to the cathode. There are two firing grids, 3 and 4, of which the first, 3, is connected to an external lead 5 through the base, and the second, 4, has its own connection brought out through the envelope through a flanged copper connecting member 4A. A gas reservoir 6, for example, a hydrogen or deuterium reservoir (depending upon the gas filling used) is provided and is arranged to be heated from a separate supply through a lead 7. The cathode heater is supplied with heating current through a lead 8. The return paths for the gas reservoir heater and cathode heater are common and made through the cathode connection 2.

A further grid 9 similar to the grid 4 but inverted with respect thereto—i.e., the two grids 4 and 9 are back to back—is provided adjacent the grid 4, and another further grid 10, spaced from the grid 9 by a drift space 11, is provided adjacent and on the cathode side of the anode 12. The grids 4, 9 and 10 may, as shown, conveniently be similar, the grids 4 and 10 being the same way round and the grid 9 being inverted as indicated. The envelope of the tube may be comprised of ceramic cylinders 13, as indicated. Connections to the grids 9 and 10 and the anode 12 are brought out through the envelope by means of flanged copper connecting members 9A, 10A and 12A respectively.

The tube as so far described is similar to the thyratron described and illustrated in the aforementioned United States patent application Ser. No. 479,807. It has two breakdown gaps which are effectively in series, one being between the grids 4 and 9 and the other being between the grid 10 and the anode 12. When a voltage is applied between the anode and the cathode it will tend to divide equally between the two gaps due to the existence of generally similar capacities between the electrodes 4 and 9 on the one hand, and the electrodes 10 and 12 on the other. A potential dividing resistance may, if desired, be connected between the anode and the cathode and the electrodes 9 and 10 may be connected together and to an intermediate point on said resistance. Instead of connecting the electrodes 9 and 10 directly together a small resistance may be inserted between them, to provide at low anode voltages a sufficient potential difference to carry electrons across the drift space 11 until they come under the influence of the anode field.

In operation firing pulses are applied in sequence to the grids 3 and 4 and the tube breaks down across the gap between electrodes 4 and 9. When electrons have been carried across the drift space 11 and come under the influence of the anode field, breakdown occurs across the gap between electrodes 10 and 12. The two gaps are thus effectively in series and the hold-off voltage is approximately doubled as compared to that of a comparable known thyratron.

The parts provided in accordance with this invention will now be described. They include an axial cylindrical rod or thick walled tube 14 of copper brazed to the electrode 10 and having one or more radial copper rods or thick walled tubes 15 which is or are brazed to the connecting member 10A. Thus the heat is conducted from electrode 10 via parts 14 and 15 to the member 10A and thence to the outside of the envelope. In the embodiment now being described there are three rods or tubes 15 at 120°—only two appear in the figure, the third being above the plane of the section.

A similar arrangement of rod or tube 16 with radial rods or tubes 17 is provided as shown between the electrode 9 and its connection member 9A.

If the tube has more than one large drift space arrangements similar to those shown in the drift space 11 may be provided in the other large drift space or spaces.

We claim:

1. A gas filled thyratron comprising an envelope, a cathode, at least one grid and an anode and having between the anode and the grid which is furthest from the cathode, a succession of spaced further electrodes providing a plurality of breakdown gaps which are effectively in series wherein there is located in at least one drift space between two of said spaced further electrodes nearest to the anode, at least one good heat conducting member fixed to that one of said two electrodes which is nearer to said anode and at least one good heat conducting path from said member to the outside of said tube envelope to conduct away heat from said one electrode when said tube becomes conductive.

2. A thyratron as claimed in claim 1 and having a flanged cylindrical connecting member which connects the electrodes nearest the anode to the exterior of the envelope, wherein said path includes a portion of said connecting member, a radial heat conducting path being provided to said connecting member from the heat conducting member which is fixed to the electrode nearest the anode.

3. A thyratron as claimed in claim 2 wherein the said heat conducting member fixed to the electrode nearest the anode is a thick tubular member which is co-axial with the tube and is connected to the connecting member of said electrode by a thick tubular heat conductor or a plurality of such conductors circumferentially spaced.

4. A thyratron as claimed in claim 1 wherein there is also located in the drift space between the two electrodes nearest the anode a second good heat conducting member fixed to that one of said two electrodes which is further from said anode and at least one good heat conducting path is provided between said second member and the outside of the envelope, the two heat conducting members being in mutually insulated relationship.

5. A thyratron as claimed in claim 4 and having a flanged cylindrical connecting member which connects said electrode further from said anode to the exterior of the envelope wherein the good heat conducting path for the second member includes at least one good heat conductor between said second member and said flanged cylindrical connecting member of the electrode to which said second member is fixed.

6. A thyratron as claimed in claim 1 and having at least one further large drift space wherein there is provided in the further large drift space an additional heat conducting member similar to the aforesaid heat conducting members and in association therewith heat conducting paths similar to the aforesaid paths.

7. A thyratron as claimed in claim 1 wherein said good heat conducting member located in said drift space and fixed to said one of said two electrodes which is nearer to said anode contacts, said one of said two electrodes substantially inwardly from the edges of said electrode nearer said anode to provide a portion of said good heat conducting path which by-passes a substantial portion of said electrode nearest to the anode.

8. A thyratron as claimed in claim 2, said radial heat conducting path and good heat conducting member providing a heat conducting path in addition to and by-passing the path provided by the connection of said flanged cylindrical member and said electrode.

9. A thyratron as claimed in claim 8, wherein said good heat conducting member contacts said electrode nearer the anode radially inwardly from the edges thereof to conduct heat away from said electrode nearer the anode, reducing heat conduction through a substantial portion of said electrode nearer the anode.

References Cited

UNITED STATES PATENTS

| | | | |
|---|---|---|---|
| 2,239,677 | 4/1941 | Jobst | 313—296 X |
| 2,951,960 | 9/1960 | Watrous | 313—193 X |
| 3,336,492 | 8/1967 | Baker et al. | 313—192 X |
| 3,349,283 | 10/1967 | Krefft | 313—195 X |

JAMES W. LAWRENCE, *Primary Examiner.*

C. R. CAMPBELL, *Assistant Examiner.*

U.S. Cl. X.R.

313—46, 195, 204, 216, 217, 220